(12) United States Patent
Vasbø et al.

(10) Patent No.: US 10,712,470 B2
(45) Date of Patent: Jul. 14, 2020

(54) STREAMER CLEANING APPARATUS AND ASSOCIATED SYSTEMS AND METHODS

(71) Applicant: PGS Geophysical AS, Lilleaker, Oslo (NO)

(72) Inventors: Christian Vasbø, Oslo (NO); Thomas Hauge, Oslo (NO); Andreas Carlén, Trollhättan (SE)

(73) Assignee: PGS Geophysical AS, Oslo (NO)

( * ) Notice: Subject to any disclaimer, the term of this patent is extended or adjusted under 35 U.S.C. 154(b) by 431 days.

(21) Appl. No.: 15/281,961

(22) Filed: Sep. 30, 2016

(65) Prior Publication Data
US 2017/0235017 A1 Aug. 17, 2017

Related U.S. Application Data

(60) Provisional application No. 62/294,110, filed on Feb. 11, 2016.

(51) Int. Cl.
| | | |
|---|---|---|
| *G01V 13/00* | (2006.01) | |
| *B08B 1/00* | (2006.01) | |
| *G01V 1/38* | (2006.01) | |
| *B08B 9/023* | (2006.01) | |

(52) U.S. Cl.
CPC .............. *G01V 13/00* (2013.01); *B08B 1/005* (2013.01); *B08B 1/008* (2013.01); *B08B 9/023* (2013.01); *G01V 1/38* (2013.01); *G01V 1/3843* (2013.01)

(58) Field of Classification Search
CPC ......... B08B 1/005; B08B 1/008; B08B 9/023; G01V 13/00; G01V 1/38; G01V 1/3843
See application file for complete search history.

(56) References Cited

U.S. PATENT DOCUMENTS

| 7,145,833 | B1 * | 12/2006 | Hoogeveen | B08B 9/023 367/15 |
|---|---|---|---|---|
| 7,409,919 | B2 | 8/2008 | Hoogeveen | |
| 8,007,595 | B2 * | 8/2011 | Hall | B08B 9/023 134/15 |
| 8,514,664 | B2 | 8/2013 | Harrick | |
| 8,875,722 | B2 | 11/2014 | Karlsen | |
| 8,960,117 | B2 | 2/2015 | Einar Nelsen | |
| 9,254,509 | B2 | 2/2016 | Wu | |
| 9,375,763 | B2 | 6/2016 | Macquin | |
| 9,423,527 | B2 * | 8/2016 | Macquin | G01V 13/00 |

(Continued)

FOREIGN PATENT DOCUMENTS

| WO | WO-2004051316 A1 * | 6/2004 | ............ B08B 1/008 |
|---|---|---|---|
| WO | WO2015044074 A1 | 4/2015 | |

OTHER PUBLICATIONS

"Online Barnacle Cleaning", PGS, availabe at https://www.pgs.com/marine-acquisition/tools-and-techniques/operational-efficiency/technology/online-barnacle-cleaning/, © 2016.

(Continued)

*Primary Examiner* — Marc Carlson (57) ABSTRACT

Embodiments relate to marine streamer cleaning. An embodiment provides a streamer cleaning apparatus comprising: a housing comprising an inlet configured to receive a streamer and an outlet configured to dispatch the streamer; and scraper lamellas coupled to the housing, wherein the scraper lamellas are arranged to form an opening to receive the streamer. Methods of cleaning a streamer and streamer cleaning systems are also provided.

21 Claims, 11 Drawing Sheets

(56) References Cited

U.S. PATENT DOCUMENTS

| | | | |
|---|---|---|---|
| 9,933,547 B2* | 4/2018 | Macquin | B08B 1/008 |
| 2006/0054186 A1* | 3/2006 | Lepage | B08B 1/008 |
| | | | 134/6 |
| 2008/0127875 A1* | 6/2008 | Hoogeveen | B08B 9/023 |
| | | | 114/312 |
| 2010/0294314 A1 | 11/2010 | Daleside | |
| 2012/0067368 A1* | 3/2012 | Toftner | G01V 13/00 |
| | | | 134/6 |
| 2012/0222709 A1* | 9/2012 | Karlsen | G01V 1/3808 |
| | | | 134/141 |
| 2013/0098394 A1* | 4/2013 | Fleischer-Pedersen | |
| | | | B08B 9/023 |
| | | | 134/6 |
| 2013/0265850 A1* | 10/2013 | Wu | B08B 1/008 |
| | | | 367/20 |
| 2014/0174470 A1* | 6/2014 | Dalseide | B08B 1/008 |
| | | | 134/6 |
| 2014/0254311 A1* | 9/2014 | Macquin | G01V 13/00 |
| | | | 367/15 |
| 2014/0338699 A1* | 11/2014 | Bassett | G01V 13/00 |
| | | | 134/6 |
| 2015/0013719 A1* | 1/2015 | Macquin | G01V 13/00 |
| | | | 134/6 |
| 2015/0226869 A1* | 8/2015 | Harrick | B05D 3/10 |
| | | | 405/158 |
| 2015/0285949 A1* | 10/2015 | Macquin | B08B 1/008 |
| | | | 134/6 |
| 2016/0001336 A1* | 1/2016 | Macquin | B08B 9/023 |
| | | | 15/1.7 |
| 2016/0280334 A1* | 9/2016 | Hubert | B63B 21/66 |
| 2018/0283909 A1* | 10/2018 | Cerniway | G01D 11/10 |

OTHER PUBLICATIONS

European Search Report for European Application No. EP 17 15 5448 dated Jun. 14, 2017.

* cited by examiner

STREAMER CLEANING APPARATUS AND ASSOCIATED SYSTEMS AND METHODS

CROSS-REFERENCE TO RELATED APPLICATIONS

The present application claims priority to U.S. Provisional Application No. 62/294,110, filed on Feb. 11, 2016, the entire disclosure of which is incorporated herein by reference.

BACKGROUND

Techniques for marine geophysical surveying include seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more streamers also may be towed in the water at selected depths—typically above the seafloor—by the same or a different vessel. The streamers are typically cables that include a plurality of sensors disposed thereon at spaced apart locations along the length of the cable. Some geophysical surveys locate sensors on ocean bottom cables or nodes in addition to, or instead of, streamers. The energy sources may be configured to generate a signal that is related to a parameter being measured by the sensor. At selected times, the energy source may be actuated to generate, for example, seismic or electromagnetic energy that travels downwardly into the subsurface rock. Energy that interacts with interfaces, generally at the boundaries between layers of rock formations, may be returned toward the surface and detected by the sensors on the streamers. The detected energy may be used to infer certain properties of the subsurface rock, such as structure, mineral composition and fluid content, thereby providing information useful in the recovery of hydrocarbons.

Unfortunately, marine organisms may adhere to and then grow on nearly everything that is placed in water for extended periods of time, including marine geophysical sensor cables, such as towed streamers or ocean-bottom cables. For convenience, any such marine geophysical sensor cable will be referred to herein as a "streamer." A streamer may include a marine streamer that comprises seismic sensors, electromagnetic sensors, or any combination thereof.

Marine growth (also known as biofouling) often refers to barnacle growth but is intended to also include the growth of mussels, oysters, algae, bacteria, tubeworms, slime, and other marine organisms. This marine growth is particularly problematic with streamers as the marine growth can increase drag resistance of the streamer, leading to increased fuel costs and/or reduced production speed. An additional problem with marine growth includes reduced data quality due to increased noise.

BRIEF DESCRIPTION OF THE DRAWINGS

These drawings illustrate certain aspects of some of the embodiments of the present disclosure and should not be used to limit or define the disclosure.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patents or other documents that may be incorporated herein by reference, the definitions that are consistent with this specification should be adopted for the purposes of understanding this disclosure.

Figure 1:
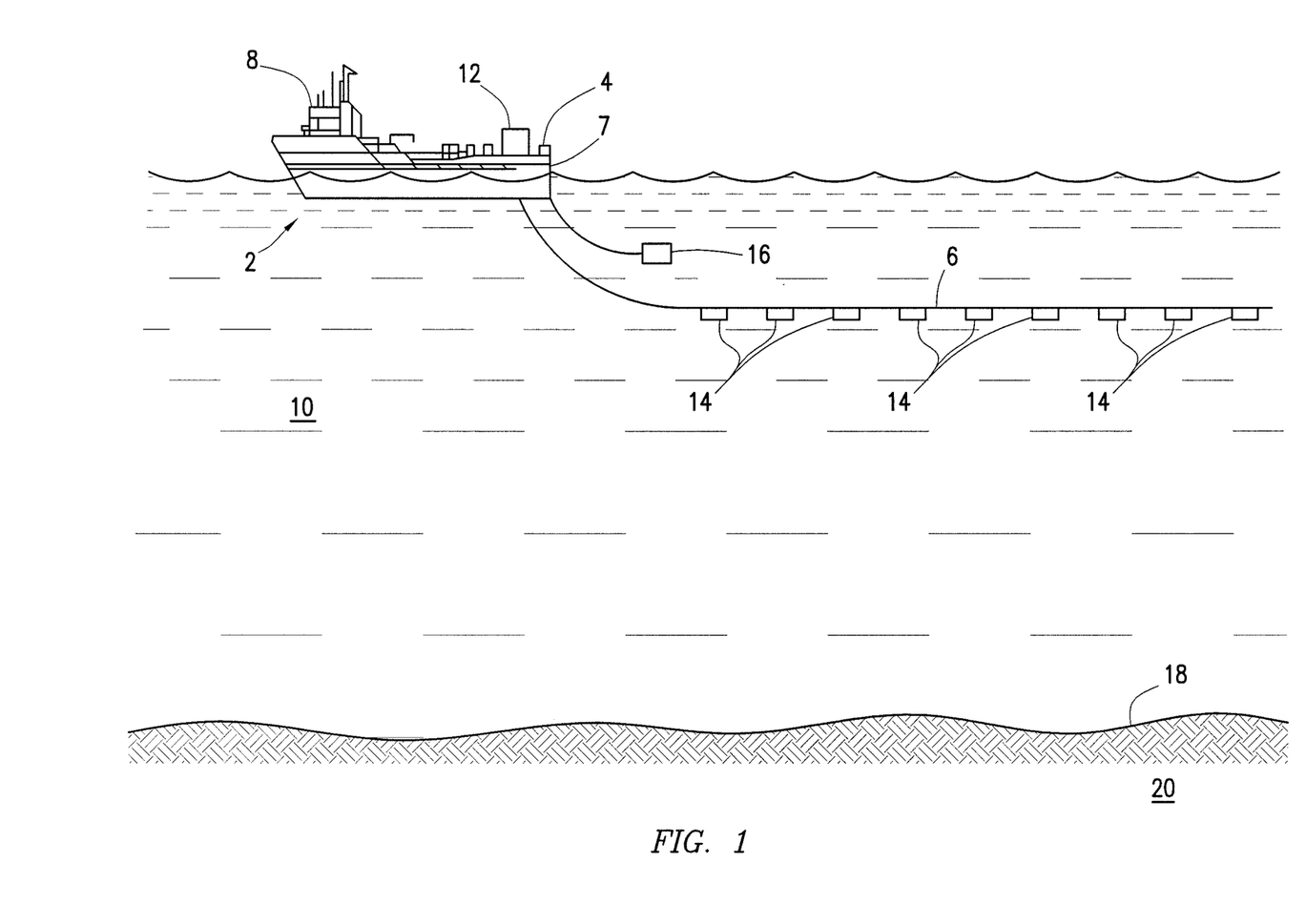
FIG. 1 illustrates an embodiment of a marine seismic survey that employs a streamer cleaning apparatus on the survey vessel.

Referring now to FIG. 1, a marine geophysical survey system 2 that employs a streamer cleaning apparatus 4 is illustrated in accordance with embodiments of the disclosure. As will be discussed in more detail below, in some embodiments, the streamer cleaning apparatus 4 may be used to clean a streamer 6. The streamer 6 may include a long cable (or other elongated structure) on which geophysical sensors 14 may be disposed at spaced apart locations along the length of the streamer 6. A streamer cleaning system may be formed by the streamer 6 and the streamer cleaning apparatus 4. Advantageously, embodiments of the disclosure may use the streamer cleaning apparatus 4 to remove saltwater, other residues or contaminants, and/or marine growths from the streamer 6. In another embodiment, a survey vessel 8 may include a plurality of the streamer cleaning apparatuses 4 configured to clean multiple streamers 6.

In the illustrated embodiment, the marine geophysical survey system 2 may include a survey vessel 8 on which the streamer cleaning apparatus 4 may be employed. The survey vessel 8 may move along the surface of a body of water 10, such as a lake or ocean. The survey vessel 8 may include thereon equipment, shown generally at 12 and collectively referred to herein as a "recording system." The recording system 12 may include devices (none shown separately) for detecting and making a time indexed record of signals generated by each of geophysical sensors 14 (explained further below) and for actuating energy source 16 at selected times. The recording system 12 may also include devices (none shown separately) for determining the geodetic position of the survey vessel 8 and the various geophysical sensors 14.

In some embodiments, the survey vessel 8 or another vessel may tow at least one streamer 6 on which geophysical sensors 14 may be disposed. As illustrated, the energy source 16 and streamer 6 may be towed above the water bottom 18. The streamer 6 may be a towed marine seismic streamer, a towed marine electromagnetic streamer, or a combination thereof. While not shown, some marine seismic surveys locate geophysical sensors 14 on ocean bottom cables or nodes in addition to, or instead of, a streamer 6. As illustrated, the geophysical sensors 14 may be disposed at spaced apart locations on the streamer 6. The geophysical sensors 14 may be, without limitation, seismic sensors such as geophones, hydrophones, or accelerometers, or electromagnetic field sensors, such as electrodes or magnetometers. The geophysical sensors 14 may generate response signals, such as electrical or optical signals, in response to detecting energy emitted from the energy source 16 after the energy has interacted with formations 20 below the water bottom 18. In some embodiments, more than one streamer 6 may be towed by the survey vessel 8 or another vessel, and the streamers 6 may be spaced apart laterally, vertically, or both laterally and vertically. The detected energy may be used to infer certain properties of the subsurface rock, such as structure, mineral composition, and fluid content, thereby providing information useful in the recovery of hydrocarbons.

In accordance with embodiments, a geophysical data product may be produced. The geophysical data product may include geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States or another country. Once onshore, geophysical analysis, including further data processing, may be performed on the geophysical data product.

In some embodiments, the streamer cleaning apparatus 4 may be located on the survey vessel 8. As illustrated, the streamer cleaning apparatus 4 may be located at or near the stern 722 of the survey vessel 8 so that the streamer cleaning apparatus 4 may be proximate the streamer 6 during its recovery from, and/or deployment into, the body of water 10. In particular embodiments, the streamer 6 may be moved into position for cleaning. Moving the streamer 6 into position may include, for example, recovering the streamer 6 from and/or deploying the streamer 6 into the body of water 10. Cleaning the streamer 6 may include passing the streamer 6 through streamer cleaning apparatus 4 secured to survey vessel 8. The streamer 6 may be cleaned as it is being recovered from body of water 10 and/or deployed into body of water 10, for example, to remove saltwater, other residues or contaminants, and/or marine growths from the streamer 6.

Figure 2A:
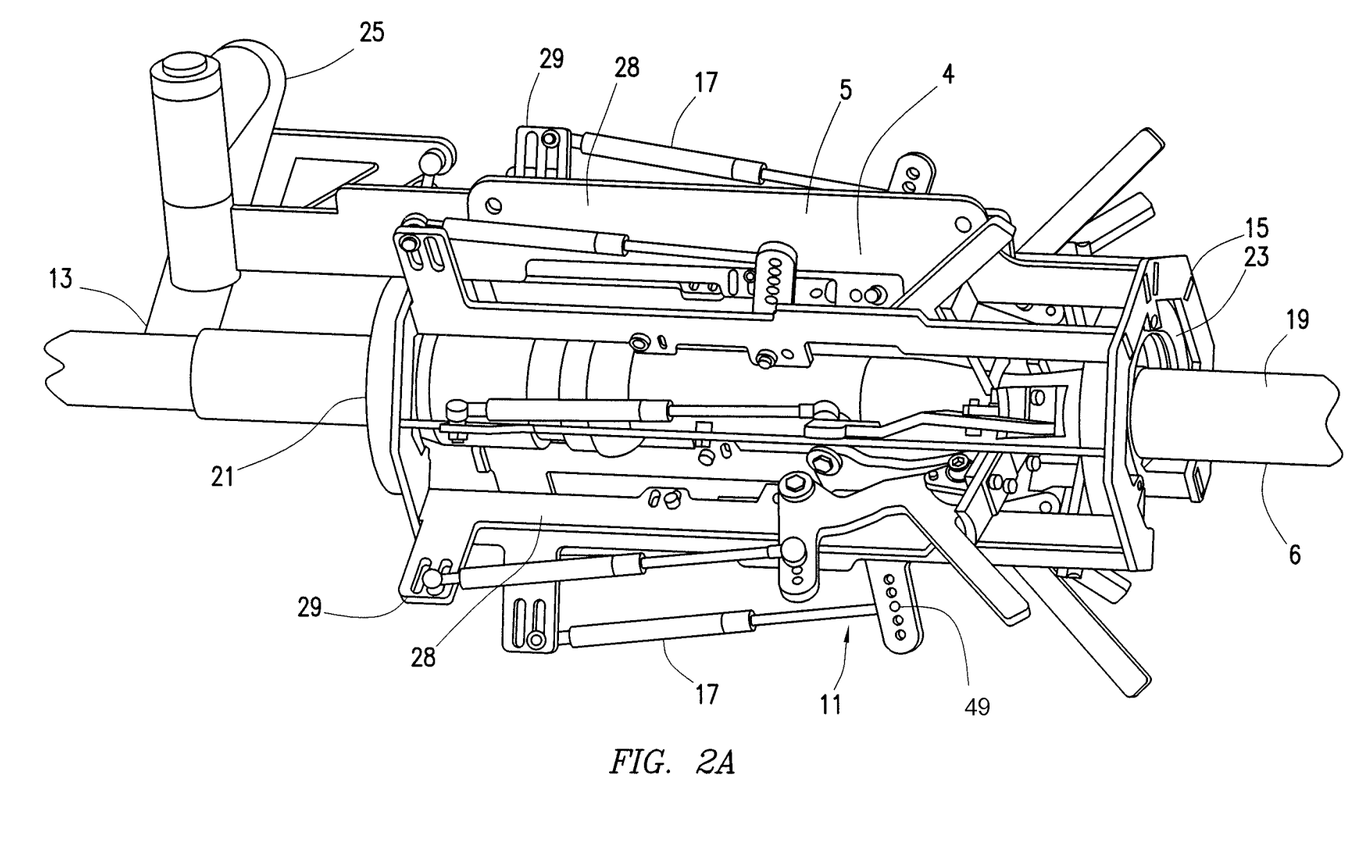
FIG. 2A illustrates an embodiment of a streamer cleaning apparatus.
Figure 2B:
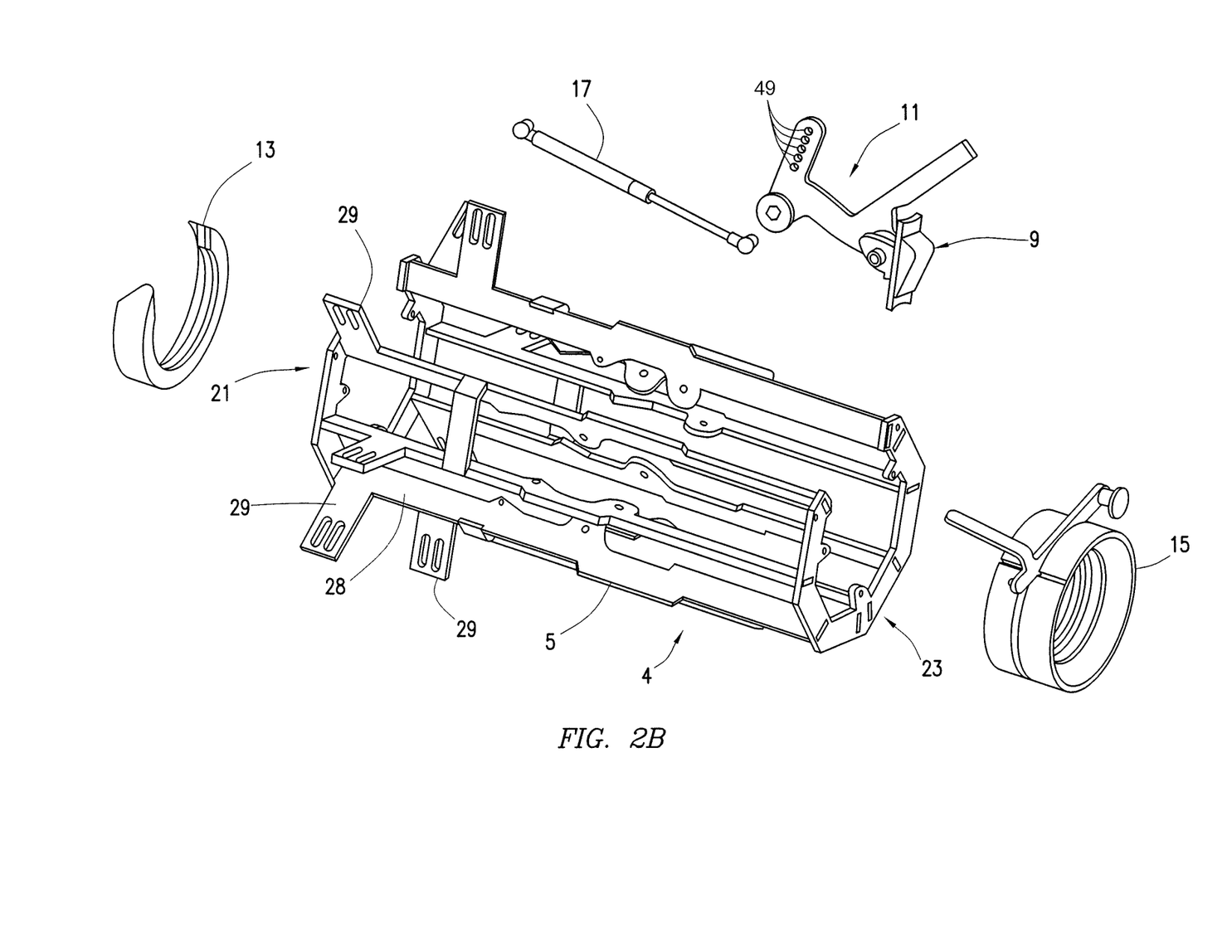
FIG. 2B illustrates a dissected view of the streamer cleaning apparatus of FIG. 2A.

Referring now to FIGS. 2A and 2B, streamer cleaning apparatus 4 may comprise a housing 5 which may comprise individual cleaning elements. For example, scraper lamellas 9 may be coupled to the housing 5. The housing 5 may be of any suitable shape, including a tubular shape, as shown on FIGS. 2A and 2B. In the illustrated embodiment, the housing 5 may be in the form of a metallic tubular frame-like structure and may include an inlet 21 configured to receiver the streamer 6. Inlet 21 may comprise front streamer guide 13. Housing 5 may further comprise an outlet 23 configured to dispatch the streamer 6. Outlet 23 may comprise a rear streamer guide 15. The front streamer guide 13 may be any suitable shape for guiding the streamer 6 through the housing 5. For example, the front streamer guide 13 may have an opening that is circular, semi-circular, or otherwise formed for receiving the streamer 6. As illustrated, housing 5 may include a plurality of struts 28 that extend from inlet 21 to outlet 23. In some embodiments, the struts 28 may include tabs 29 coupled to the spring loaded arms 11. In the illustrated embodiment, each of the struts 28 includes a tab 29 at the inlet 21 of housing 5.

Scraper lamellas 9 may be arranged to contact the streamer 6 as it passes through the housing 5. For example, the scraper lamellas 9 may scrape the streamer 6 as the streamer 6 is being passed through the streamer cleaning apparatus 4. The scraper lamellas 9 may be arranged to form an opening to receive the streamer 6. As it is being passed through, the scraper lamellas 9 engage with the exterior surface 19 of the streamer 6 to remove undesirable material, such as saltwater, other residues or contaminants, and/or marine growths, from the streamer 6. A spring 17 may bias the scraper lamellas 9 to provide a scraping force sufficient for removal of the undesirable material from the exterior surface 19. As illustrated, the scraper lamellas 9 may be a thin flat scale, membrane, or layer. The scraper lamellas 9 may be made from any suitable material, including, without limitation, plastic and/or metal. The scraper lamellas 9 may be a plate (e.g., a flat plate) with a concave radius adjusted to the streamer diameter, or slightly larger. The thickness may be between about 2 to about 15 mm depending on the material used. While not illustrated, the edge of the scraper lamellas 9 in contact with the exterior surface 19 of the streamer 6 may taper to provide increased friction at the contact point. The lamella material may be rigid or flexible. The scraper lamellas 9 may be evenly spaced in the housing 5. The angle of the scraper lamellas 9 relative to the streamer may be from perpendicular to 45°. In certain embodiments, the scraper lamellas 9 may be fixed. In alternative embodiments, the scraper lamellas 9 may be adjustable. The scraper lamellas 9 may be configured to adapt to a shape of the streamer 6, and may be configured to clean circular and non-circular areas of the streamer 6. In at least one embodiment, the scraper lamellas 9 may be configured to remove particles/contaminants on sections of streamer 6 comprising a radiused profile as well as sections of streamer 6 or streamer 6 mounted components comprising a generally flat profile.

The scraper lamellas 9 may clean (scrape) the streamer 6 as it passes through streamer cleaning apparatus 4. The housing 5 may further comprise multiple spring loaded arms 11 which may include a spring 17, which may be a gas spring, mechanical spring, or other suitable spring element for biasing the scraper lamellas 9. The scraper lamellas 9 may be coupled to the spring loaded arms 11. Each spring loaded arm 11 may be coupled to a single scraper lamella 9, as illustrated in FIG. 2B. Moreover, each spring loaded arm 11 may be coupled to a single strut 28. By way of example, each spring loaded arm 11 may be connected to a tab 29 that extends from a strut 28. Techniques for coupling/attachment throughout the present disclosure may include, without limitation, adhesive, mechanical fasteners, welds, threads or any combination thereof.

Figure 2C:
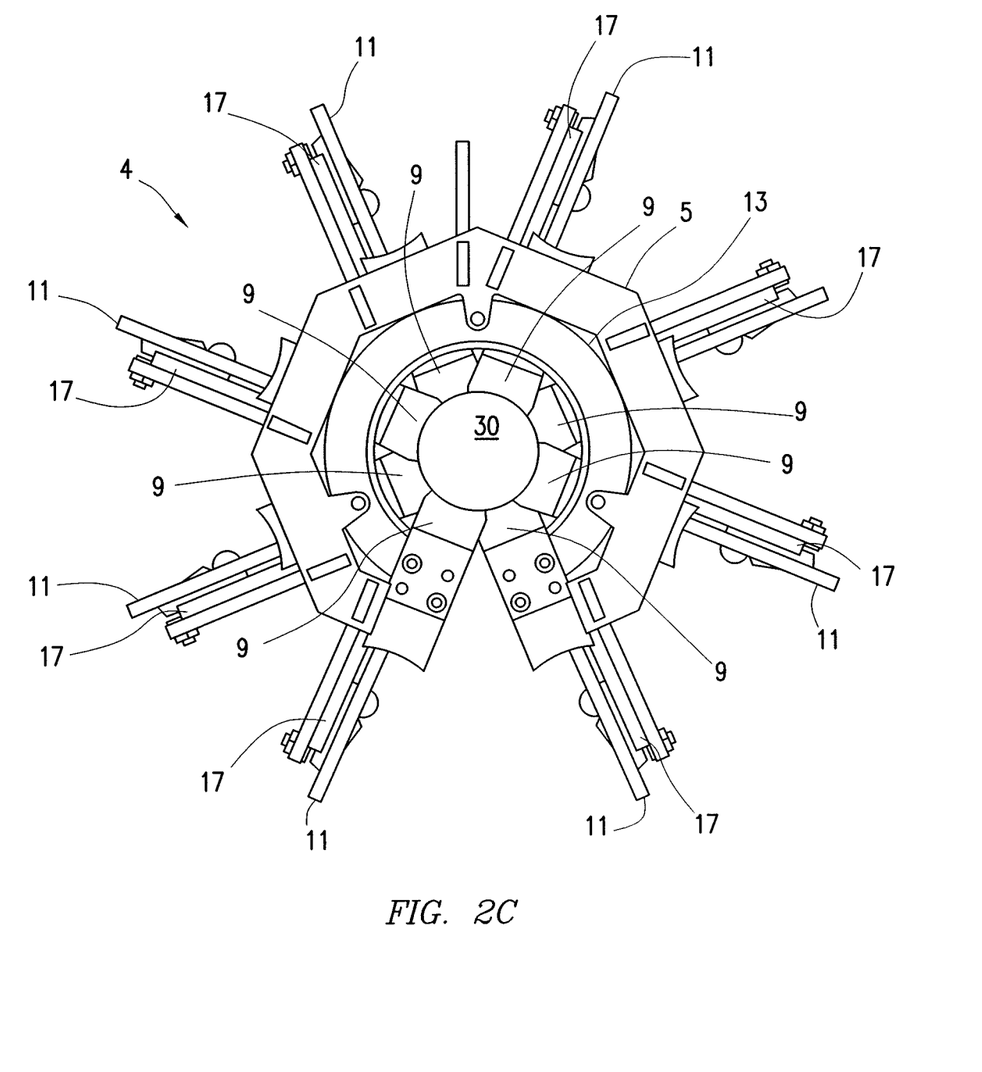
FIG. 2C illustrates a frontal view of the streamer cleaning apparatus of FIG. 2A.

Referring now to FIG. 2C, a front end view of the streamer cleaning apparatus 4 is provided. Front streamer guide 13 may guide the streamer 6 (e.g., shown on FIG. 2A) as the streamer 6 enters the streamer cleaning apparatus 4. As illustrated, the scraper lamellas 9 may be positioned along an inner diameter of the housing 5. In the illustrated embodiment, the scraper lamellas 9 are be positioned around the housing 5 in the form of a ring so that the scraper lamellas 9 may contact streamer 6 as it passes through the streamer cleaning apparatus 4. By way of example, the scraper lamellas 9 may be circumferentially arranged around the housing 5 to form a ring with a through opening 30 through which the streamer 6 passes. While FIG. 2C illustrates the eight scraper lamellas 9, it should be understood that present embodiments may encompass more or less than eight scraper lamellas 9 as may be desired for a particular application. As illustrated, each of the scraper lamellas 9 may have a corresponding spring loaded arm 11 and spring 17.

Figure 2D:
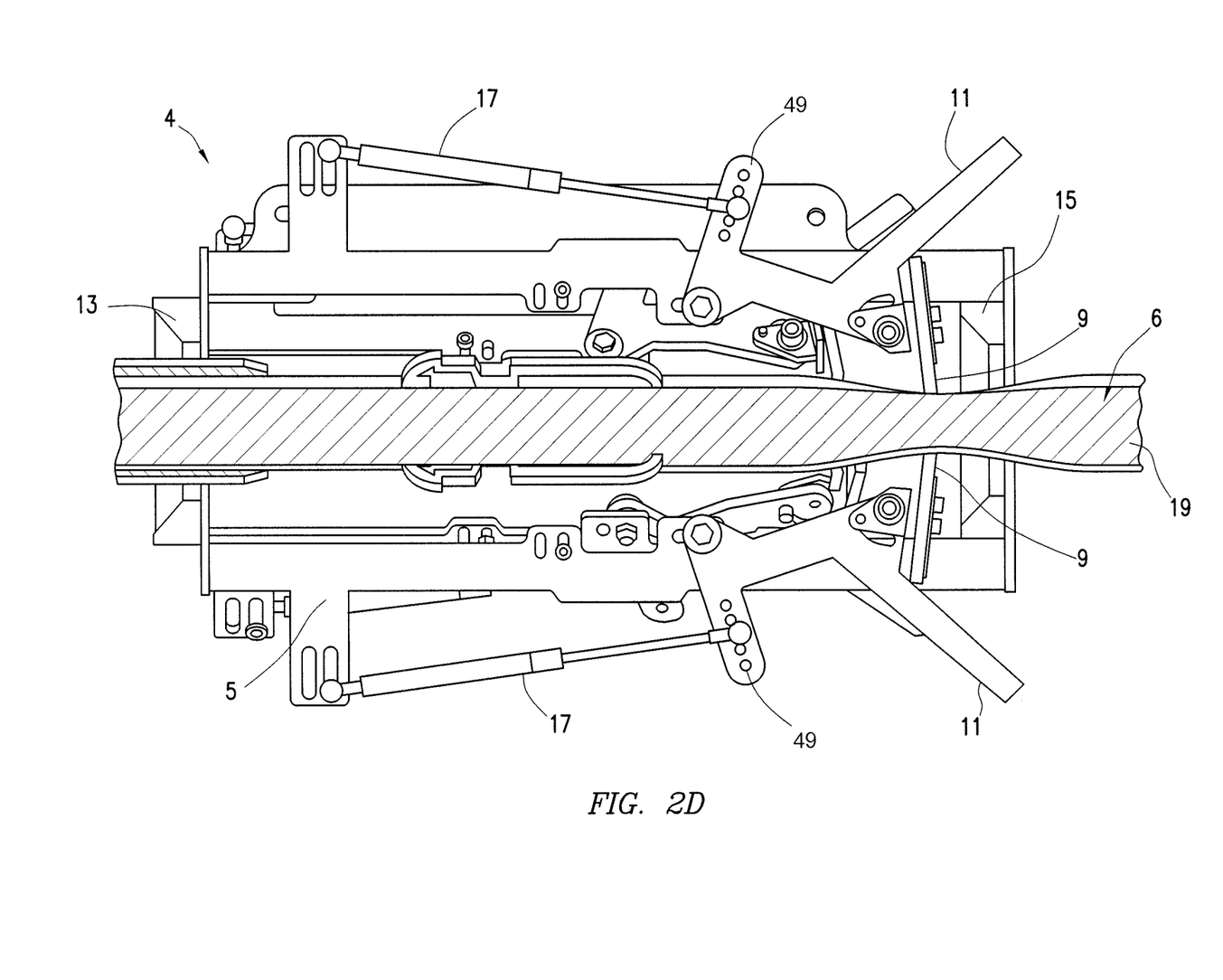
FIG. 2D illustrates a cross sectional view of the streamer cleaning apparatus of FIG. 2A.

With additional reference to FIG. 2D, the position of the spring 17 may be adjusted via apertures 49 located on each spring loaded arm 11. The adjustment may allow for more or less pressure applied to the streamer 6 via scraper lamellas 9. Also, the scraper lamellas 9 may be adjusted to clean streamers 6 of any suitable diameter, including, but not limited to, from about ranging in diameter from about 20 mm to about 100 mm or from 50 mm to about 100. However, the streamer 6 may also have a diameter that is larger or small than the example ranges disclosed herein. The scraper lamellas 9 may move individually as they contact the streamer, thus enabling adaptation to the shape of streamer 6. An advantage with this design may be that the scraper lamellas 9 may remove barnacles and algae in non-circular streamer areas and near modules positioned on streamer. These areas may especially be exposed to barnacle growth. This design may allow scraping off of contaminants, such as, for example, barnacles and slime/algae from the streamer 6 during recovery or deployment of streamer 6. The geometry of the scraper lamellas 9, along with the use of a spring 17 (or similar) may allow the scraping force for each of the scraper lamellas 9 to be the substantially constant on the exterior surface 19 of the streamer 6 as for larger diameter modules mounted on the streamer 6. The scraping force applied by the scraper lamellas 9 may be considered substantially constant if it is within 10%, 5%, or even less. The scraping force range may be from approximately 5 to 30 kg at the edge of the scraper lamellas 9 (10-70 lb). A biasing force may be provided with the spring loaded arms 11 to the scraper lamellas 9 as the streamer 6 passes through the streamer cleaning apparatus 4. For example, the spring loaded arms 11 may be configured to move individually and configured to provide a biasing force to the scraper lamellas 9. The amount of engagement should be sufficient to assure that the scraper lamellas 9 effectively clean the exterior of the streamer 6, but should provide sufficiently low engagement force to enable relatively free movement of the housing 5 along the streamer 6. The internal diameter of a ring formed by the scraper lamellas 9 in an uncompressed configuration (i.e., without any outward pressure being applied from the streamer 6) may less than an external diameter of the streamer 6. For example, the internal diameter of the ring formed by the scraper lamellas 9 can thus be slightly smaller than the nominal external diameter of the streamer 6 when the scraper lamellas 9 are not compressed by contact with the streamer 6. When the scraper lamellas 9 are not compressed, the diameter may be approximately 30 mm, compared to the nominal external diameter of streamer 6 that may be 63 mm. Power input (power source) may not be needed for the streamer cleaning apparatus 4, as the scraping action may utilize the relative streamer 6 speed (e.g., about 0 m/s to about 2 m/s) as streamer 6 may be reeled onto, or off, streamer 6 spools or winches. As mentioned above, due to self adjusting spring mechanisms (spring loaded arms 11), the scraper lamellas 9 may adapt to the streamer 6 shape and diameter transitions. This may allow the scraper lamellas 9 to access flat spots on streamer 6. The scraper lamellas 9 may also adapt to, and clean, larger diameter streamer equipment such as, for example, connectors, connector covers, and/or quick-cuffs.

With reference now to FIGS. 1 to 2D, a method for using the streamer cleaning apparatus 4 in cleaning the streamer 6 will now be described in more detail. As best seen on FIG. 2A, the streamer 6 may be passed through the streamer cleaning apparatus 4. The streamer cleaning apparatus 4 may be secured to the survey vessel 8. By way of example, the streamer 6 may be passed through the streamer cleaning apparatus 4 during recovery onto the survey vessel 8 or deployment into the body of water 10. Embodiments, however, should not be limited to use of the streamer cleaning apparatus 4 with the survey vessel 8, and it should be understood that embodiments may include use of the streamer cleaning apparatus 4 with other types of vessels, such as workboat 33 (e.g., shown on FIGS. 5A and 5B). As the streamer 6 is being passed through the streamer cleaning apparatus 4, the scraper lamellas 9 may scrape the streamer 6. More particularly, the scraper lamellas 9 may engage the exterior surface 19 of the streamer 6 to remove undesirable material, such as saltwater, other residues or contaminants, and/or marine growths, from the streamer 6. The spring loaded arms 11 may provide a biasing force to the scraper lamellas 9 such that the scraper lamellas 9 engage the streamer 6 with a scraping force for cleaning. The scraper lamellas 9 and spring loaded arms 11 may be configured such that the scraper lamellas 9 each provide a substantially constant scraping force to the streamer 6, regardless of diameter. In addition, the spring loaded arms 11 should allow the scraper lamellas 9 to each individually move, enabling adaptation to the shape of streamer 6.

Figure 3:
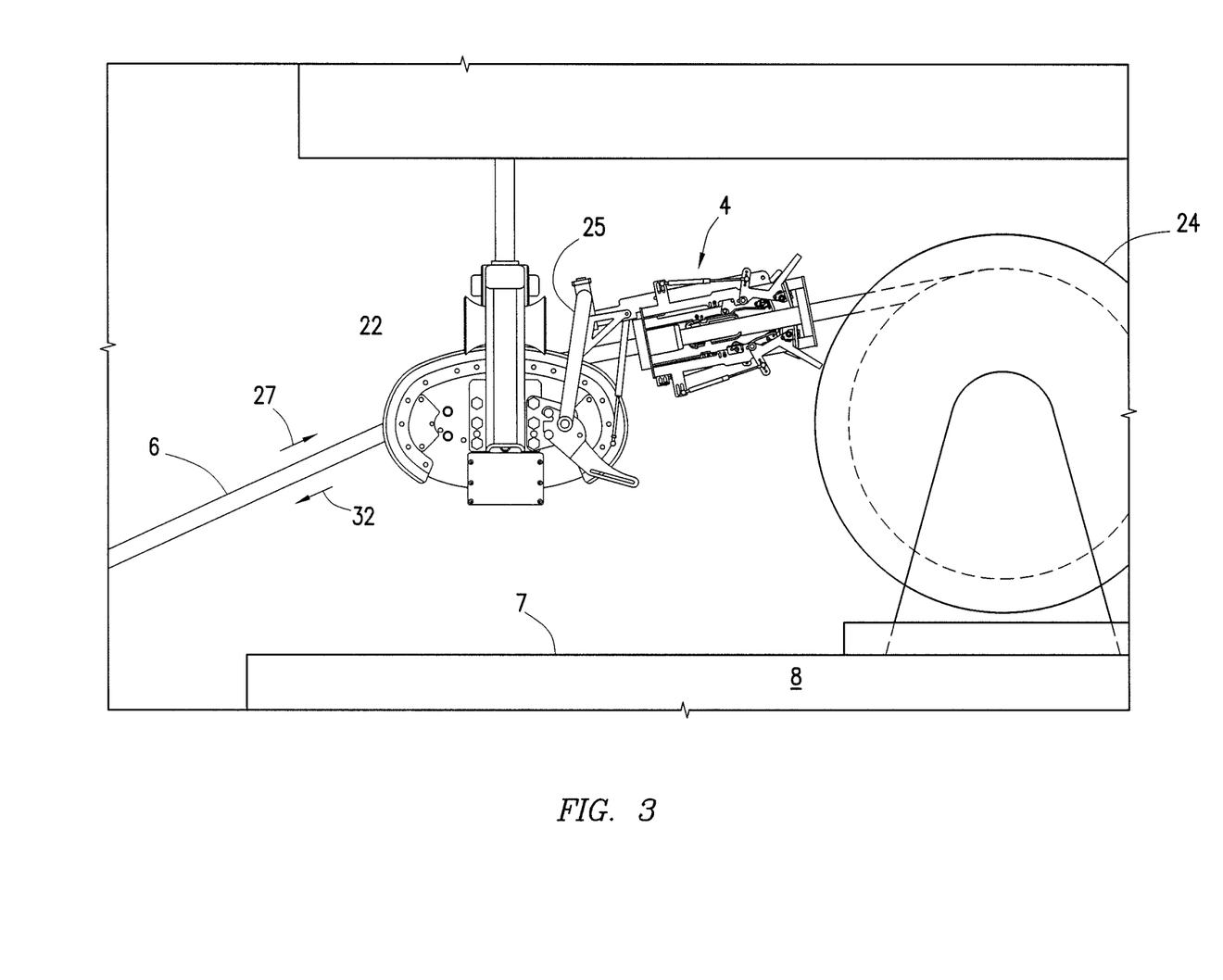
FIG. 3 illustrates an embodiment that employs a streamer cleaning apparatus on recovery or deployment of a streamer.

Referring now to FIG. 3, an embodiment is illustrated that employs the streamer cleaning apparatus 4 on recovery of the streamer 6. Streamer cleaning apparatus 4 may be coupled to tow block 22 on survey vessel 8, for example, with mounting arm 25. As illustrated, the streamer 6 may be recovered onto the stern 7 of the survey vessel 8. For example, the streamer 6 may be reeled onto spool 24 located on survey vessel 8. The streamer 6 may be retrieved in the direction indicated by arrow 27. In some embodiments, a tow block 22 or other suitable device may be used to aid in distribution of the streamer 6 on the spool 24. In the illustrated embodiment, the streamer cleaning apparatus 4 may be disposed on the stern 7 of the survey vessel 8 to clean the streamer 6 as it is being recovered from a body of water (e.g., body of water 10 on FIG. 1). The streamer 6 may be passed through the streamer cleaning apparatus 4 prior to storage on the spool 24.

Alternatively, streamer cleaning apparatus 4 may be used during deployment of the streamer 6. Cleaning of the streamer 6 on deployment may be used in place of, or in addition to, cleaning on recovery, for example, as described above. In some embodiments, it may be desired to use the streamer cleaning apparatus 4 on recovery even where cleaning may also be employed on deployment to prevent marine growth on the streamer 6 while stored on the spool 24. As illustrated, the streamer 6 may be stored on the spool 24. The streamer 6 may be unwound from the spool 24 and deployed in the body of water 10. The tow block 22 may help facilitate removal of the streamer 6 from the spool 24. In the illustrated embodiment, the streamer 6 may move towards the body of water 10 (shown in FIG. 1) during deployment, indicated by arrow 32.

Figure 4:
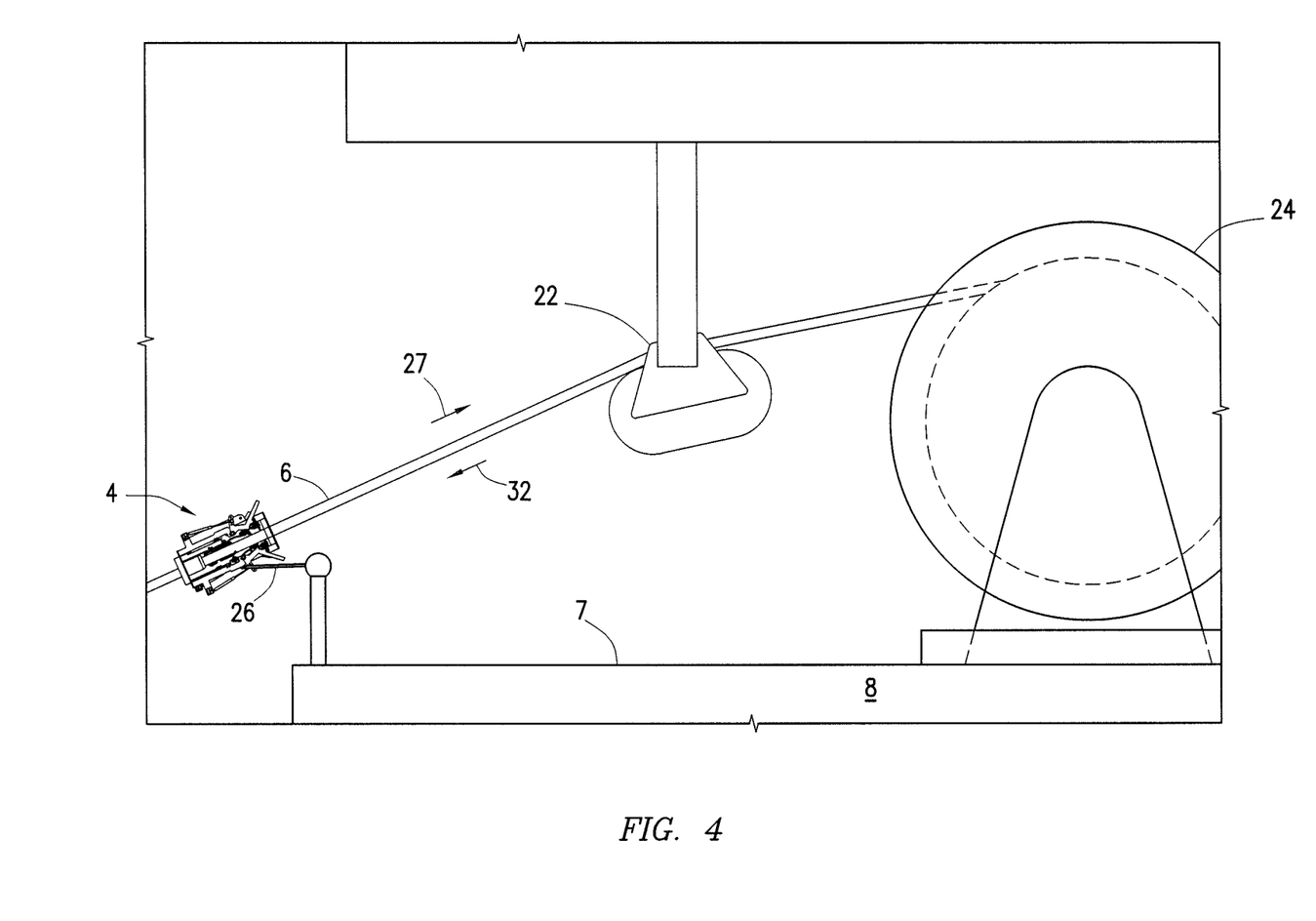
FIG. 4 illustrates another embodiment that employs a streamer cleaning apparatus on recovery or deployment of a streamer.

In alternate embodiments, as shown in FIG. 4, the streamer cleaning apparatus 4 may be on or over the stern 7 of the survey vessel 8 and may be stabilized by tethering member 26 which may be in the form of a telescopic arm, for example, which can be anchored to a fixed point on the survey vessel 8. In addition to providing stability, the telescopic arm may enable recovery of the streamer cleaning apparatus 4 to a working area on the survey vessel 8 for maintenance. In at least one embodiment, the streamer cleaning apparatus 4 may be attached to other structures on a streamer deck of the survey vessel 8, such as the aft railing, winch, and/or spool either via stiff members, wires, lines or ropes, for example.

Figure 5A:
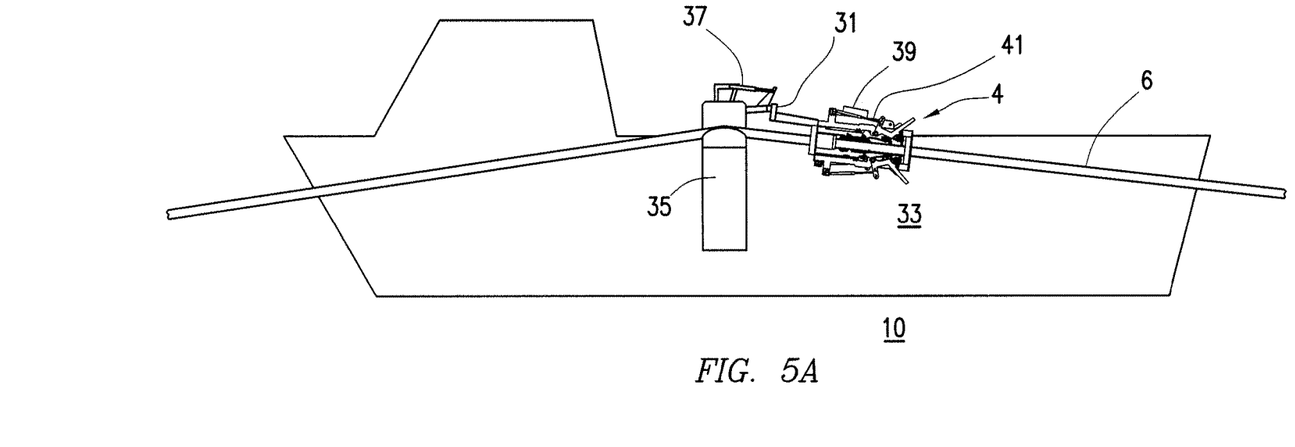
FIG. 5A illustrates an embodiment of a workboat scraper.
Figure 5B:
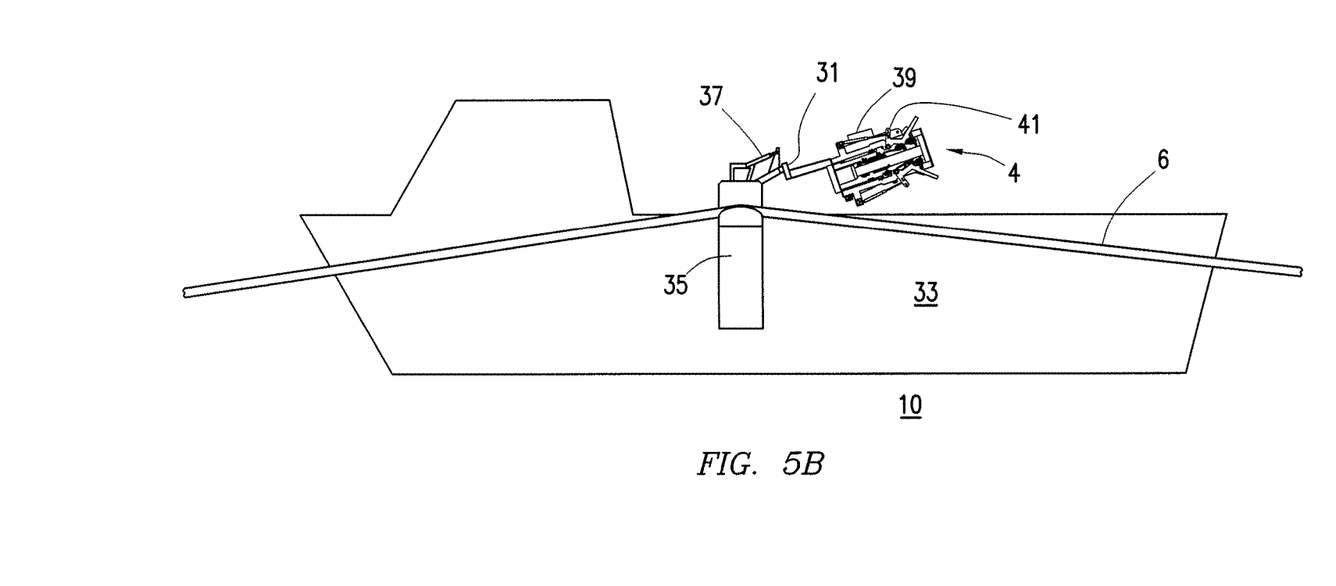
FIG. 5B illustrates another embodiment of a workboat scraper.

FIGS. 5A and 5B illustrate an embodiment of the present disclosure that may allow for automating cleaning (e.g., cleaning of barnacles, salt deposits, etc.) of streamers 6 on a workboat 33 using the streamer cleaning apparatus 4. The streamer cleaning apparatus 4, which may also may be referred to as a scraper mechanism or cleaning mechanism, may be adapted for cleaning from a workboat 33 with higher efficiency as compared to existing workboat scraper approaches. Streamer cleaning apparatus 4 may be attached to streamer guide assembly 35 of workboat 33, the streamer 6 extending through the streamer guide assembly 35. Streamer guide assembly 35 may be attached to a side of workboat 33 and may include mounting arm 31, tension spring 37, grip handle 39 and weak link 41. Tension spring 37 may assist mounting arm 31 in raising streamer cleaning apparatus 4 from streamer 6 and lowering streamer cleaning apparatus 4 onto streamer 6. Grip handle 39 may assist in pulling/detaching streamer cleaning apparatus 4 from streamer 6. Weak link 41 may be positioned between mounting arm 31 and streamer cleaning apparatus 4. Weak link 41 may serve as a safety mechanism if an unintended object is stuck in the streamer cleaning apparatus 4. Weak link 41 may prevent damage on other workboat equipment by allowing detachment of streamer cleaning apparatus 4 from mounting arm 31. Weak link 41 may include, for example, a shear pin with a pre-selected tension before failure. While not shown, weak link 41 may also be used with the embodiment of FIG. 3 for attachment of streamer cleaning apparatus 4 to tow block 22 (or other suitable device) on survey vessel 8.

With continued reference to FIGS. 5A and 5B, streamer 6 may be lifted above a body of water 10 with streamer guide assembly 35. Streamer guide assembly 35 may include a lifting/lowering mechanism for raising streamer 6 from the body of water 10 and lowering streamer 6 into the body of water 10. The streamer cleaning apparatus 4 may be positioned onto streamer 6, and workboat 33 may be driven along streamer 6 so that the scraper lamellas 9 (shown on FIG. 2C) may remove barnacles, slime/algae, or other undesired materials. The typical speed of the workboat 33 relative to the streamer 6 may be about 1-2 m/s. FIG. 5B illustrates streamer cleaning apparatus 4 detached from streamer 6. Spring loaded arms 11 may be opened in order to detach the streamer cleaning apparatus 4 from the streamer 6 when passing streamer equipment, such as streamer positioning devices (e.g., birds), acoustic pingers, etc.

Figure 5C:
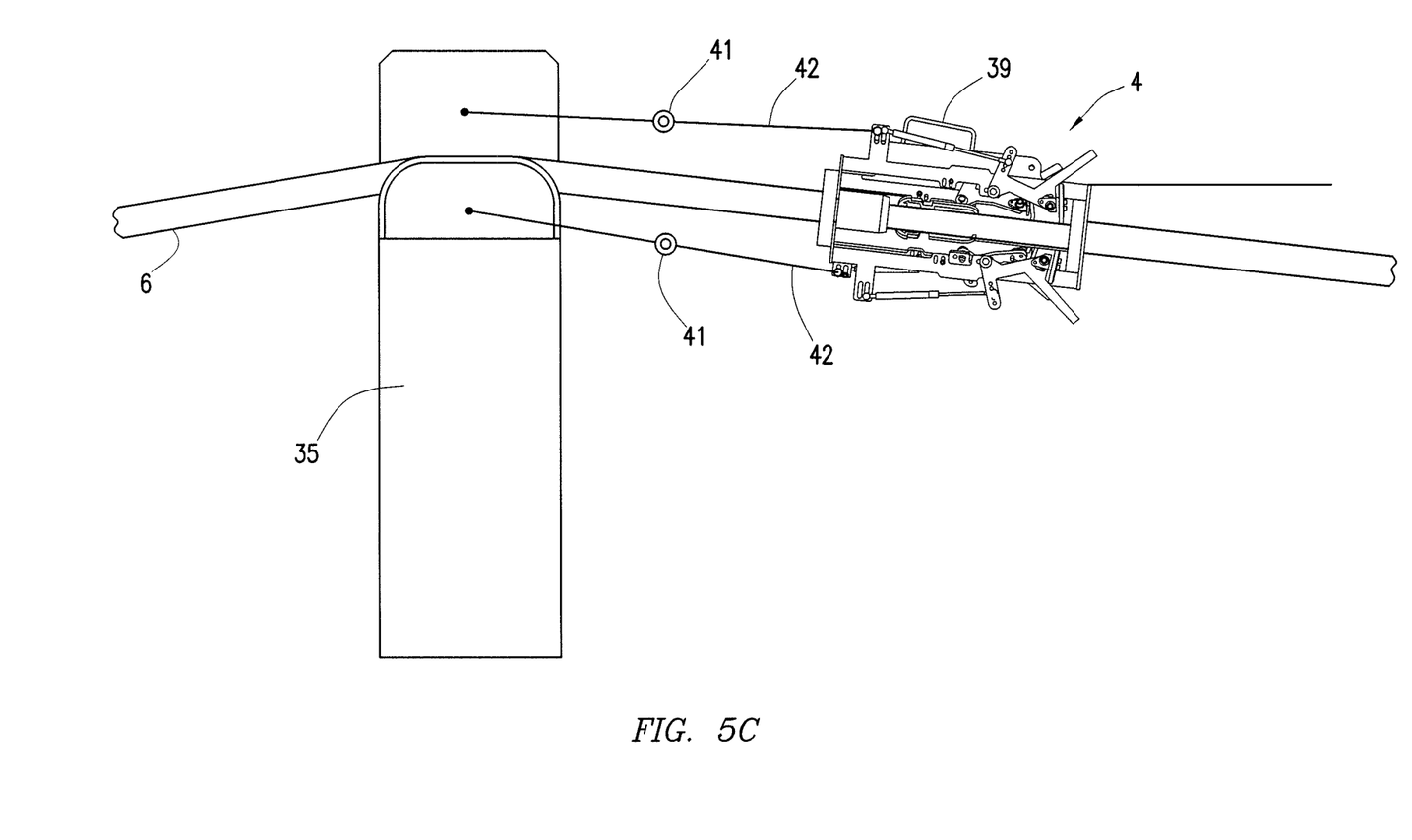
FIG. 5C illustrates an embodiment of a streamer guide assembly.

FIG. 5C illustrates an alternative embodiment of streamer guide assembly 35. In this embodiment, streamer guide assembly 35 may include at least two lines 42 (e.g., ropes, wires) coupled to streamer cleaning apparatus 4. As illustrated, two lines 42 are shown, however, streamer guide assembly 35 may include more than two lines 42. Lines 42 may position/suspend streamer cleaning apparatus 4 onto streamer 6. Lines 42 may include weak links 41 which may allow detachment of streamer cleaning apparatus 4 from streamer guide assembly 35 if an unintended object is stuck in the streamer cleaning apparatus 4. If an unintended object is stuck in the streamer cleaning apparatus 4, lines 42 may break/detach at weak links 41, thus, preventing damage to other workboat equipment. While not shown, lines 42 may also be used with the embodiment of FIG. 3 for attachment of streamer cleaning apparatus 4 to tow block 22 (or other suitable device) on survey vessel 8.

Figure 6A:
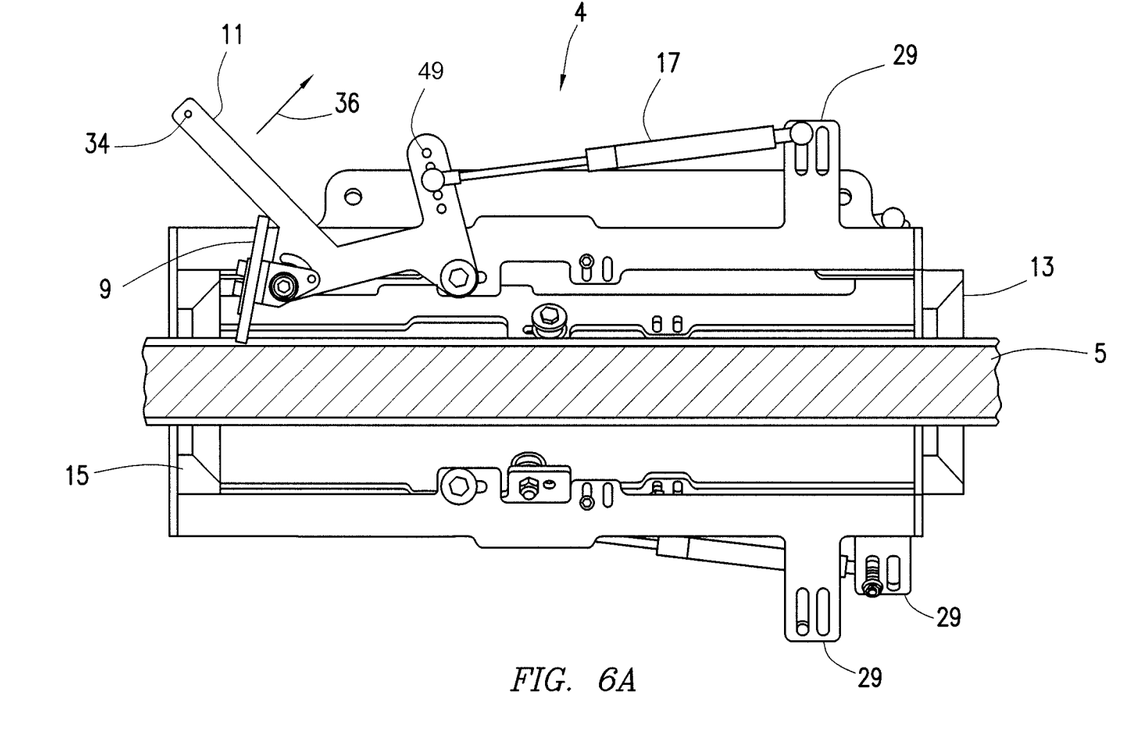
FIG. 6A illustrates spring loaded arms in a closed position.
Figure 6B:
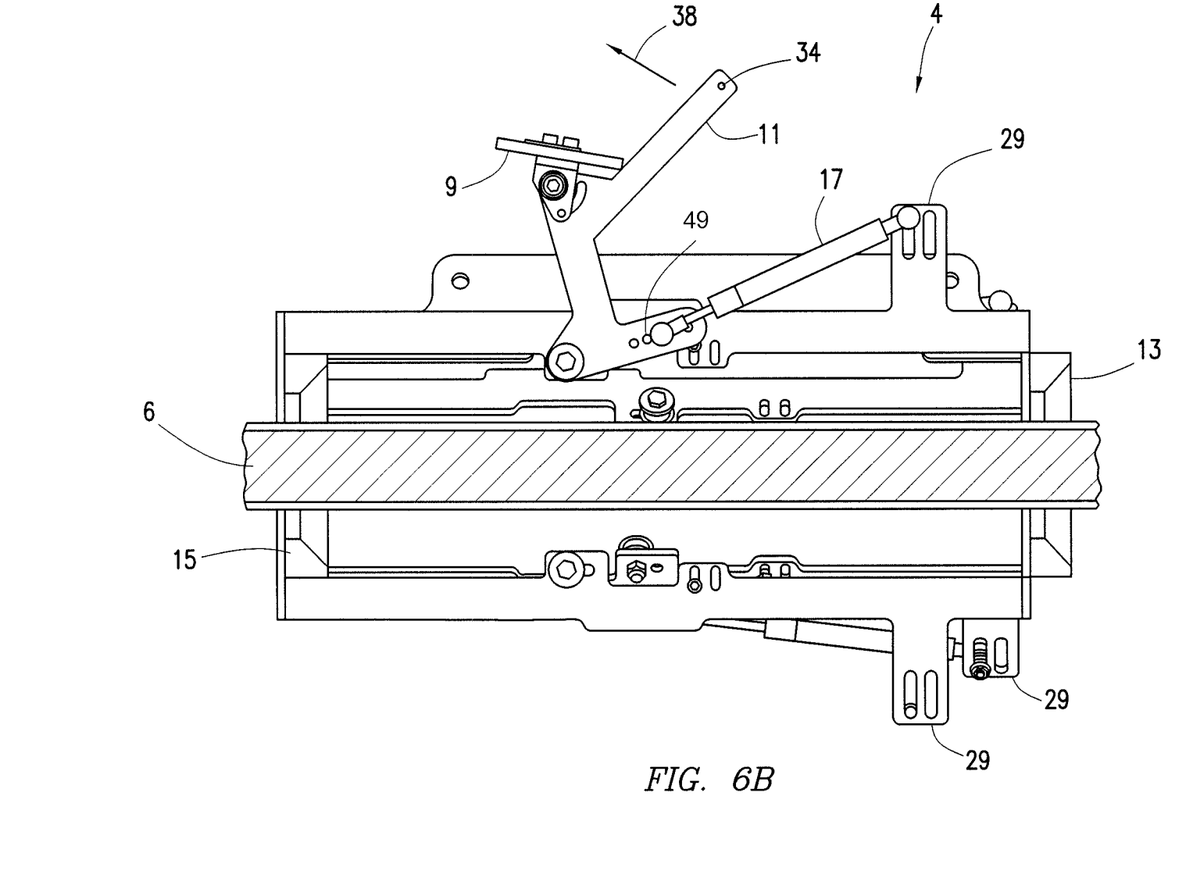
FIG. 6B illustrates spring loaded arms in an open position.

In alternate embodiments, as shown in FIGS. 6A and 6B, each spring loaded arm 11 may include handle 34 to open or close each spring loaded arm 11. FIG. 6A shows spring loaded arm 11 in a closed position. When in a closed position, scraper lamellas 9 may exert a compressive force against streamer 6. Spring loaded arm 11 may be opened by pulling the handle 34 in the direction of arrow 36. This handle 34 may be opened and closed manually or by a mechanical and/or electrical system attached to the handle 34. FIG. 6B shows spring loaded arm 11 in an open position. When in an open position, scraper lamellas 9 may not exert a compressive force against streamer 6. Spring loaded arm 11 may be closed by pulling the handle 34 in the direction of arrow 38.

The streamer cleaning apparatus 4 may reduce marine growth on the streamer 6 where used in the body of water 10, which can result in several advantages. By way of example, the reduction of marine growth may reduce drag on the streamer 6, allowing towing through the body of water 10 (e.g., FIG. 1) with a higher energy efficiency. With a reduced drag, fuel costs may be reduced for the same survey configuration or a greater towing capacity may be utilized at the same fuel costs. Moreover, reduction in marine growth on the streamer 6 may also reduce eddy formations resulting in a reduction in noise from a turbulent flow.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless states otherwise. The above description is intended to cover such alternatives, modifications, and equivalents as would be apparent to a person skilled in the art having the benefit of this disclosure.

The scope of the present disclosure includes any feature of combination of features disclosed herein (either explicitly or implicitly), or any generalization thereof, whether or not it mitigates any or all of the problems addressed herein.

Various advantages of the present disclosure have been described herein, but embodiments may provide some, all, or none of such advantages, or may provide other advantages.

What is claimed is:

1. A streamer cleaning apparatus comprising:
a housing comprising an inlet configured to receive a streamer and an outlet configured to dispatch the streamer, wherein the housing comprises a plurality of struts that extend from the inlet to the outlet, wherein the plurality of struts comprise tabs;
spring loaded arms coupled to the tabs; and
scraper lamellas coupled to the housing and biased by the spring loaded arms, wherein each of the scraper lamellas comprises a plate, the scraper lamellas being arranged in the housing to form an opening to receive the streamer.

2. The streamer cleaning apparatus of claim 1, wherein the scraper lamellas are coupled to an inner diameter of the housing.

3. The streamer cleaning apparatus of claim 1, wherein the housing is of a tubular shape.

4. The streamer cleaning apparatus of claim 1, wherein the scraper lamellas are coupled to a plurality of spring loaded arms.

5. The streamer cleaning apparatus of claim 4, wherein the spring loaded arms are configured to individually move each of the scraper lamellas, thereby allowing a ring formed by the scraper lamellas to be adaptable to a shape of the streamer.

6. The streamer cleaning apparatus of claim 4, wherein the spring loaded arms are configured to provide a biasing force to each of the scraper lamellas, thereby providing a scraping force for each of the scraper lamellas that is substantially constant regardless of diameter of the streamer.

7. The streamer cleaning apparatus of claim 4, wherein each of the spring loaded arms comprises a handle to move the respective spring loaded arm from an open position to a closed position, wherein the scraper lamellas exert a compressive force against the streamer in the closed position.

8. The streamer cleaning apparatus of claim 1, wherein the scraper lamellas are each a plate with a concave radius, wherein a thickness of each of the scraper lamellas ranges from about 2 millimeters to about 15 millimeters.

9. The streamer cleaning apparatus of claim 1, wherein the scraper lamellas are configured to individually move to clean circular and non-circular areas of the streamer.

10. The streamer cleaning apparatus of claim 1, wherein the plate of each of the scraper lamellas further comprises a flat plate with a concave radius.

11. The streamer cleaning apparatus of claim 1, wherein the angle of the scraper lamellas relative to the streamer is between perpendicular to 45 degrees.

12. A streamer cleaning system comprising:
a streamer; and
a streamer cleaning apparatus, wherein the streamer cleaning apparatus is coupled to a vessel by a mounting arm and a weak link, wherein the streamer cleaning apparatus comprises:
a housing comprising an inlet configured to receive the streamer and an outlet configured to dispatch the streamer, wherein the housing comprises a plurality of struts that extend from the inlet to the outlet, wherein the plurality of struts comprise tabs;
a spring loaded arm coupled to the tabs; and
scraper lamellas coupled to the housing, wherein the scraper lamellas are arranged to form an opening to receive the streamer.

13. The streamer cleaning system of claim 12, wherein the scraper lamellas are configured to individually move to clean circular and non-circular areas of the streamer.

14. The streamer cleaning system of claim 12, wherein the streamer is a towed marine electromagnetic streamer, towed marine seismic streamer, or any combination thereof.

15. The streamer cleaning system of claim 12, wherein an internal diameter defined by a ring formed by the scraper lamellas in an uncompressed configuration is less than an external diameter of the streamer.

16. The streamer cleaning system of claim 12, further comprising a plurality of spring loaded arms coupled to the scraper lamellas, wherein the spring loaded arms are configured to individually move each of the scraper lamellas, thereby allowing a ring formed by the scraper lamellas to be adaptable to a shape of the streamer.

17. The streamer cleaning system of claim 12, wherein the spring loaded arms are configured to provide a biasing force to each of the scraper lamellas, thereby providing a scraping force for each of the scraper lamellas that is substantially constant regardless of diameter of the streamer.

18. The streamer cleaning system of claim 12, further comprising a plurality of spring loaded arms coupled to the scraper lamellas, wherein each of the spring loaded arms comprises a handle to move the respective spring loaded arm from an open position to a closed position, wherein the scraper lamellas exert a compressive force against the streamer in the closed position.

19. The streamer cleaning system of claim 12, wherein the streamer cleaning apparatus comprises a mounting arm coupling the streamer cleaning apparatus to a tow block on a stem of the vessel, wherein the vessel is a survey vessel.

20. A streamer cleaning system comprising:
a streamer;
a streamer cleaning apparatus, wherein the streamer cleaning apparatus is coupled to a vessel, wherein the streamer cleaning apparatus comprises:
a housing comprising an inlet configured to receive the streamer and an outlet configured to dispatch the streamer;
scraper lamellas coupled to the housing, wherein the scraper lamellas are arranged to form an opening to receive the streamer; and
a streamer guide assembly attached to the vessel through which the streamer extends, wherein the streamer cleaning apparatus is attached to the streamer guide assembly, wherein the streamer guide assembly comprises a mounting arm for lowering the streamer cleaning apparatus onto the streamer, a tension spring for assisting the mounting arm, a grip handle for assisting in detaching the streamer cleaning apparatus from the streamer, and a weak link positioned between the mounting arm and the streamer cleaning apparatus.

21. A streamer cleaning system comprising:
a streamer;
a streamer cleaning apparatus, wherein the streamer cleaning apparatus is coupled to a vessel, wherein the streamer cleaning apparatus comprises:
a housing comprising an inlet configured to receive the streamer and an outlet configured to dispatch the streamer;
scraper lamellas coupled to the housing, wherein the scraper lamellas are arranged to form an opening to receive the streamer; and a streamer guide assembly attached to the vessel through which the streamer extends, wherein at least two lines couple the streamer cleaning apparatus to the streamer guide assembly, wherein at least one of the two lines comprises a weak link.

\* \* \* \* \*